Nov. 21, 1933.    E. F. WANTLAND    1,935,755
AUTOMATIC GEAR CHANGING SET
Filed May 11, 1931    11 Sheets-Sheet 1
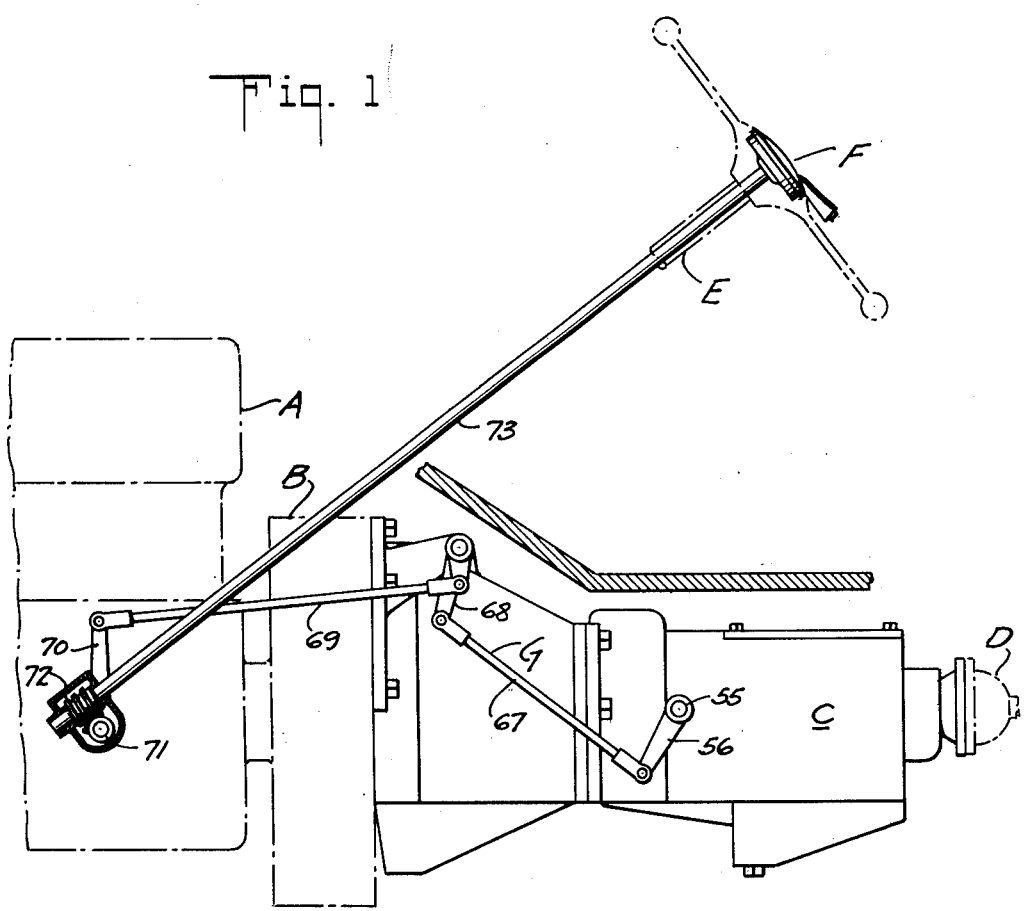
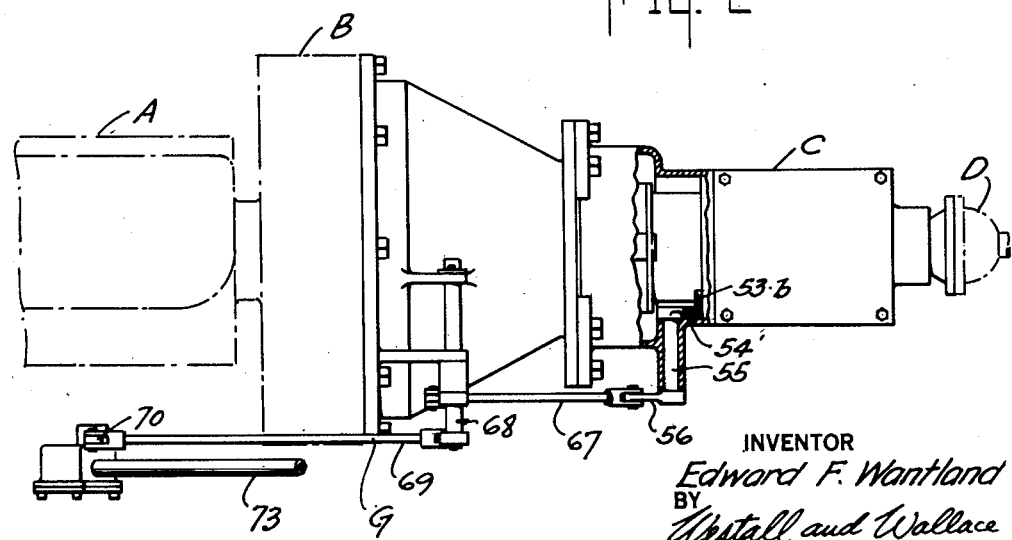
INVENTOR
Edward F. Wantland
BY
Westall and Wallace
ATTORNEYS

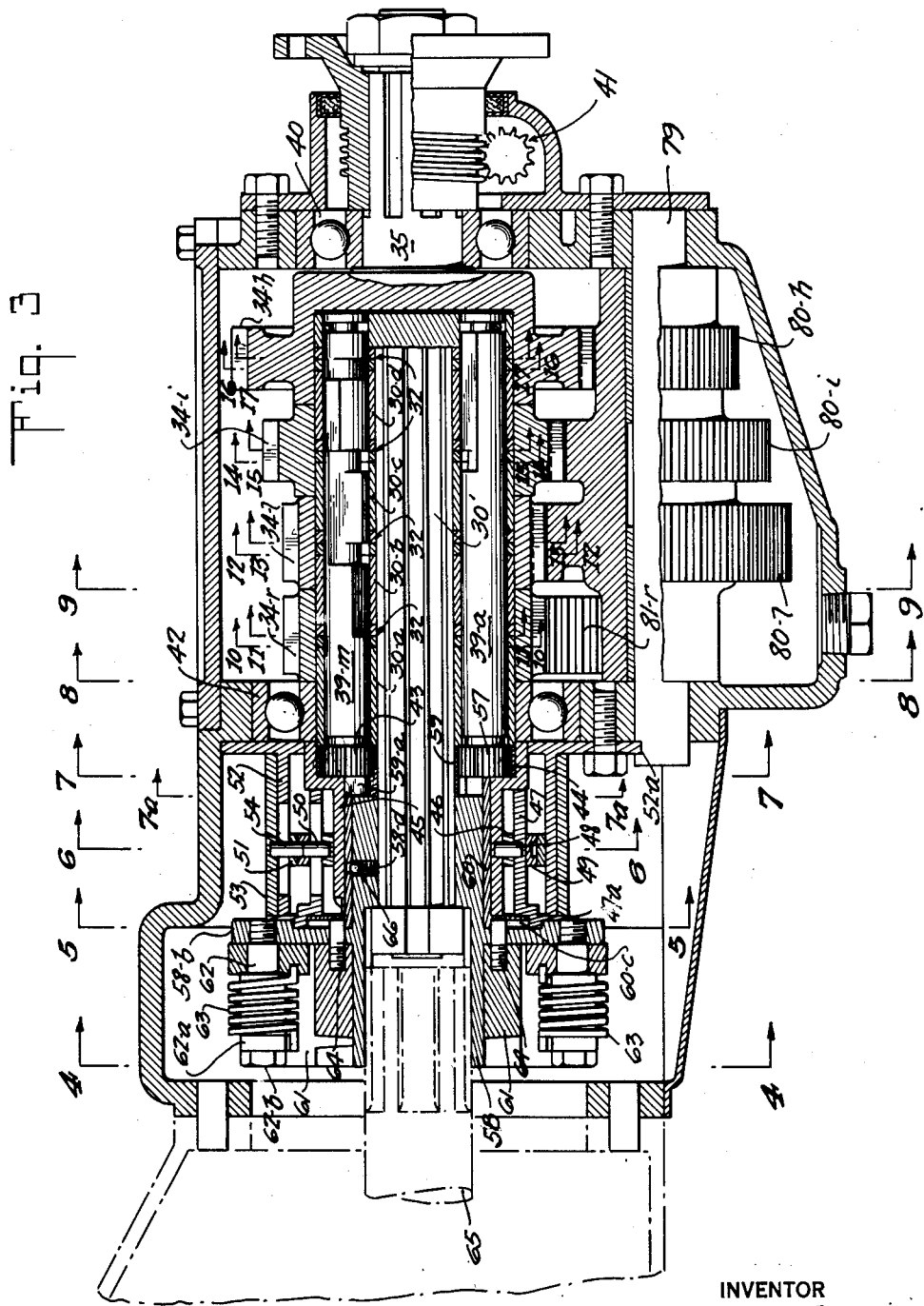

Figure 7:
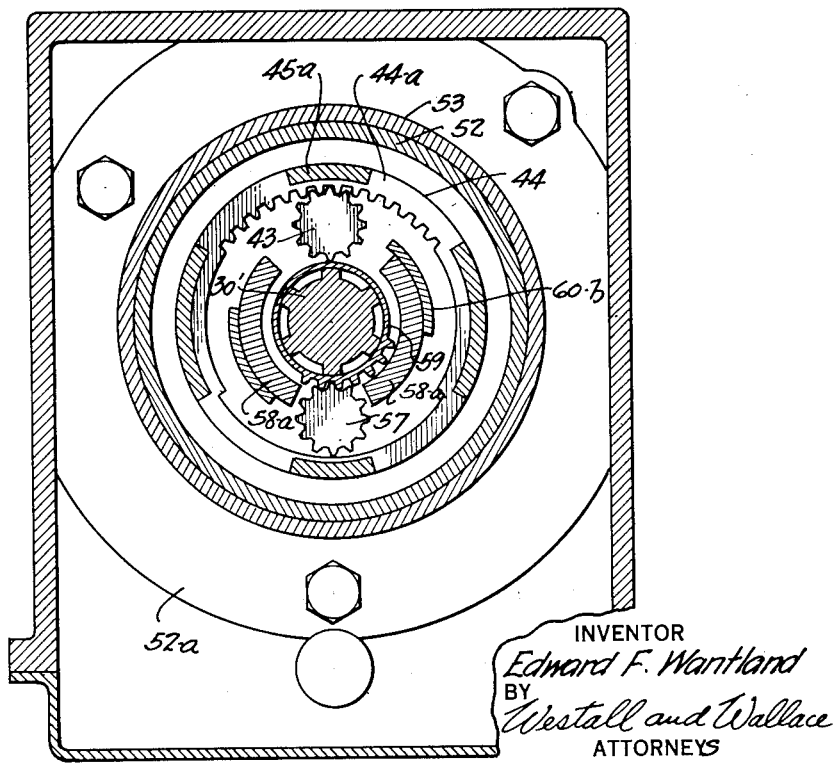

Nov. 21, 1933.  E. F. WANTLAND  1,935,755
AUTOMATIC GEAR CHANGING SET
Filed May 11, 1931   11 Sheets-Sheet 3
Fig. 4
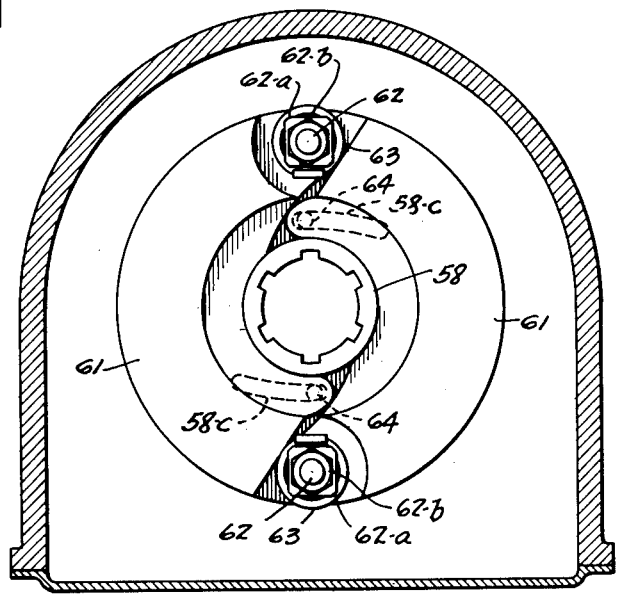
Fig. 5
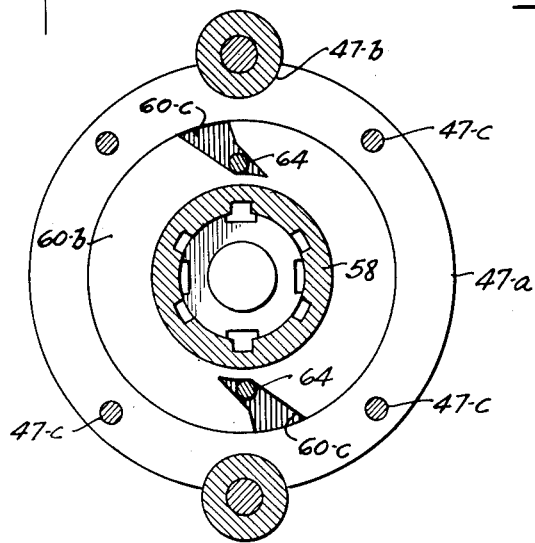
Fig. 7-a.
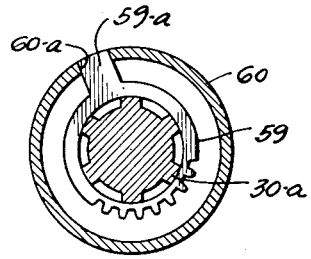
INVENTOR
Edward F. Wantland
BY
Westall and Wallace
ATTORNEYS Nov. 21, 1933.  E. F. WANTLAND  1,935,755
AUTOMATIC GEAR CHANGING SET
Filed May 11, 1931  11 Sheets-Sheet 4

INVENTOR
Edward F. Wantland
BY
Westall and Wallace
ATTORNEYS

Nov. 21, 1933.  E. F. WANTLAND  1,935,755
AUTOMATIC GEAR CHANGING SET
Filed May 11, 1931  11 Sheets-Sheet 5

INVENTOR
Edward F. Wantland
BY
Westall and Wallace
ATTORNEYS

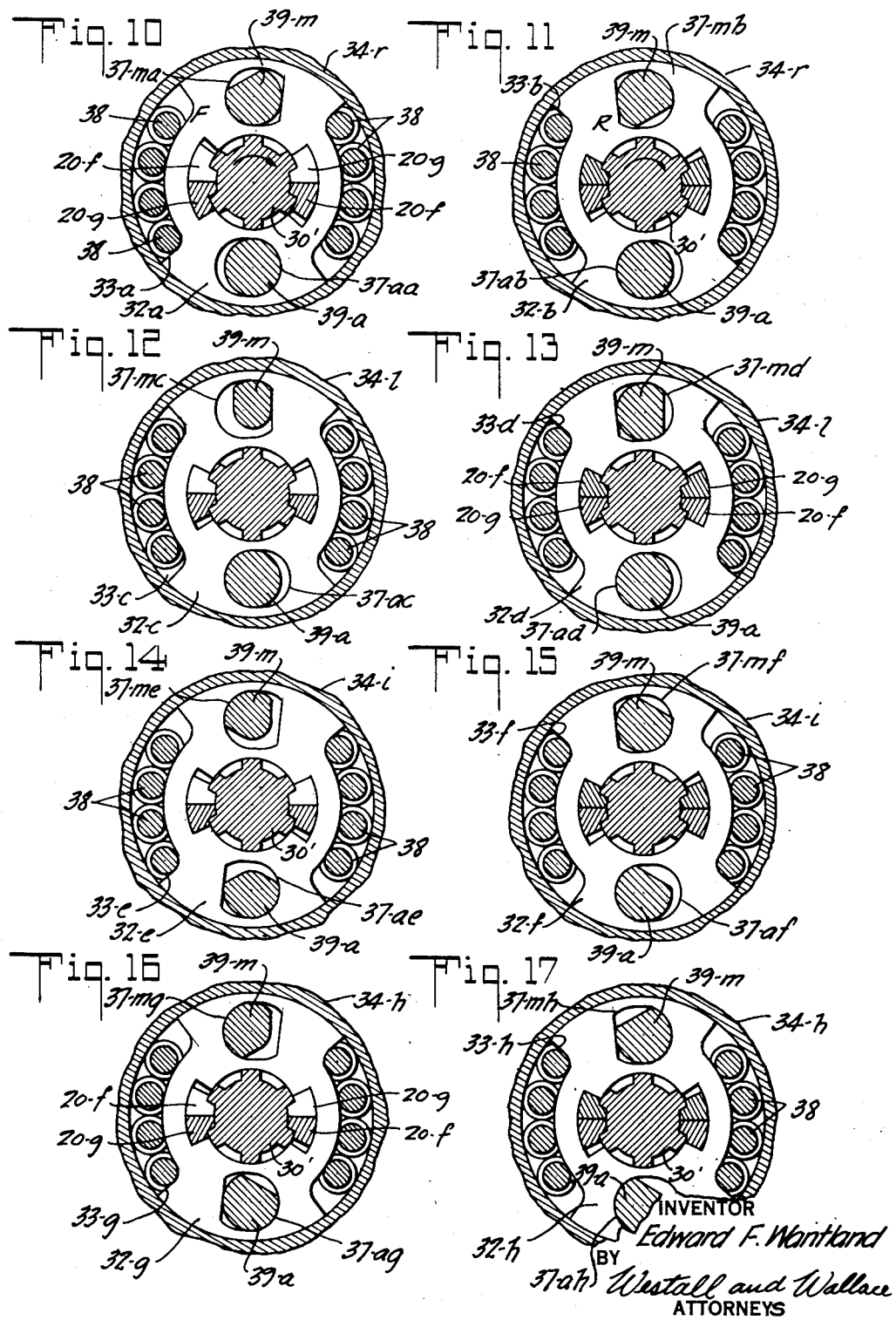

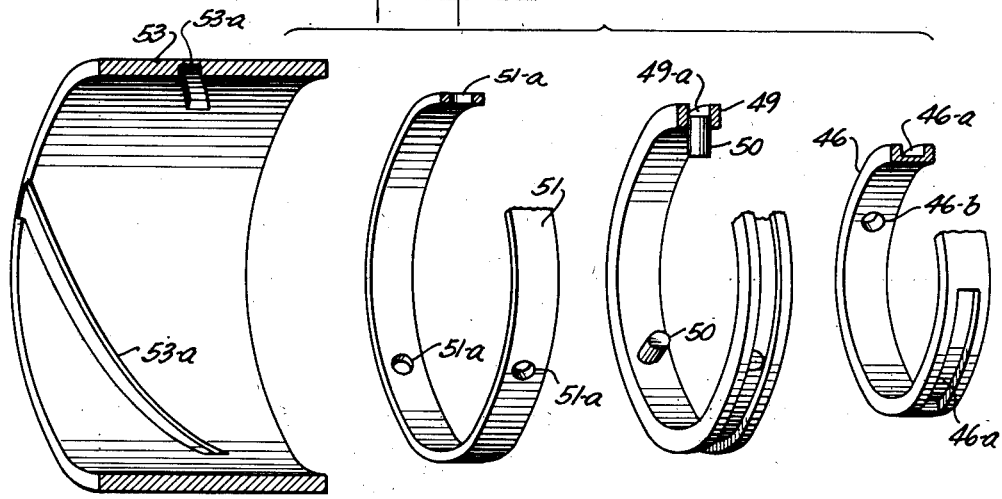
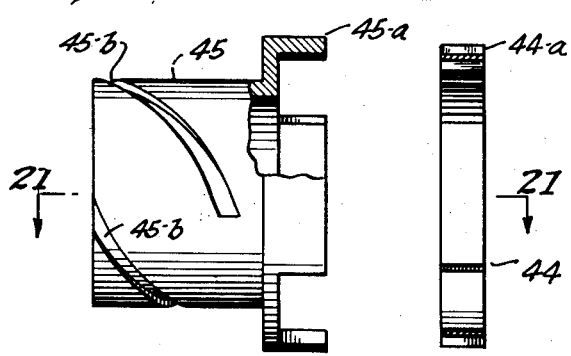
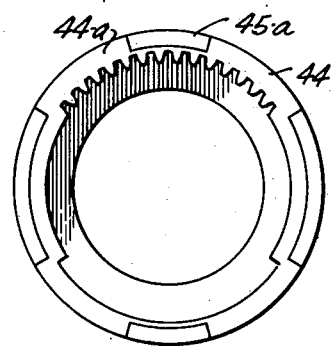
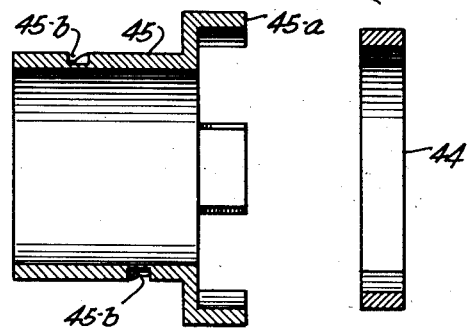

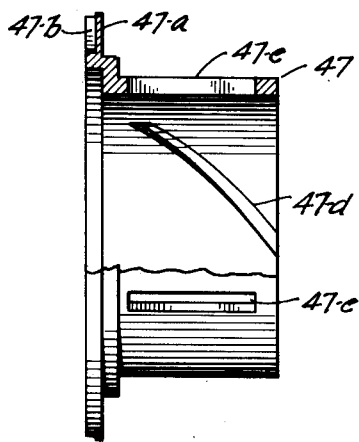
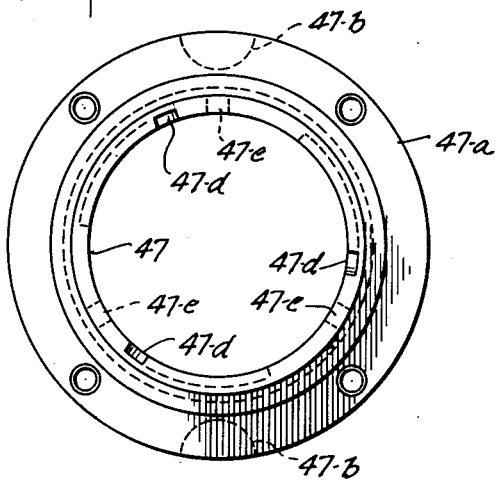
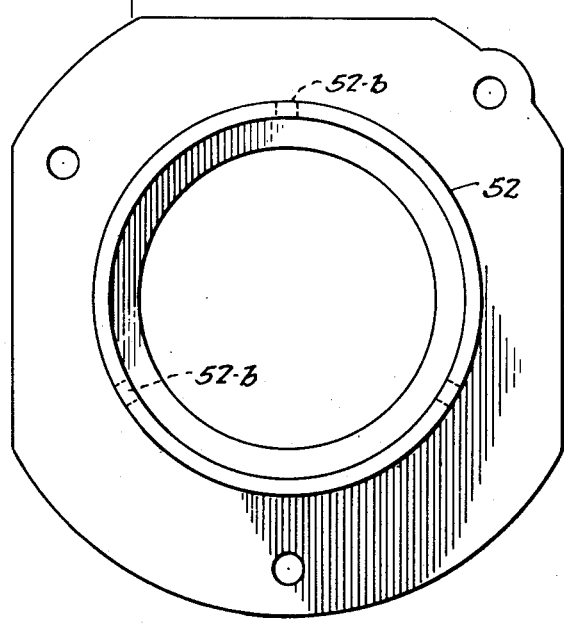
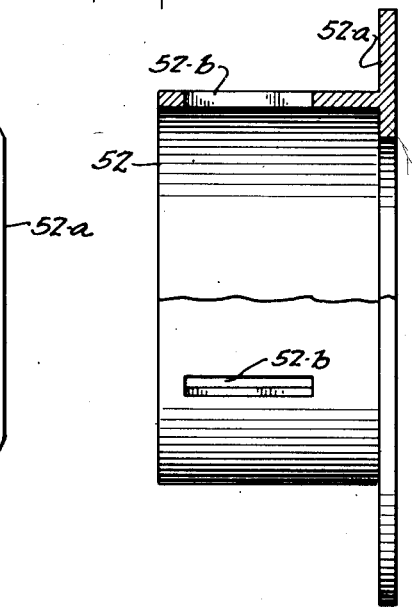

Nov. 21, 1933.  E. F. WANTLAND  1,935,755
AUTOMATIC GEAR CHANGING SET
Filed May 11, 1931   11 Sheets-Sheet 9

INVENTOR
Edward F. Wantland
BY
Westall and Wallace
ATTORNEYS

Nov. 21, 1933.  E. F. WANTLAND  1,935,755
AUTOMATIC GEAR CHANGING SET
Filed May 11, 1931  11 Sheets-Sheet 11
Fig. 31
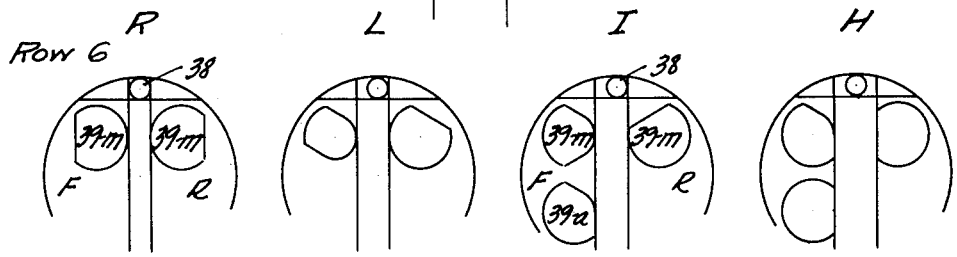
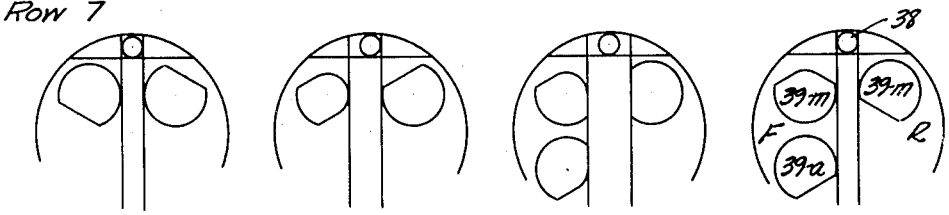
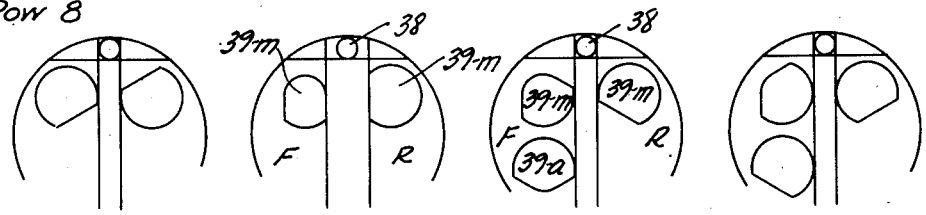
INVENTOR
*Edward F. Wantland*
BY
*Westall and Wallace*
ATTORNEYS Patented Nov. 21, 1933

1,935,755

UNITED STATES PATENT OFFICE 1,935,755

AUTOMATIC GEAR CHANGING SET

Edward F. Wantland, Beverly Hills, Calif., assignor of one-fifth to John A. Street, Los Angeles, Calif.

Application May 11, 1931. Serial No. 536,388

21 Claims. (Cl. 74—97)

This invention relates broadly to a wheel clutching mechanism and a control therefor whereby a rotatable member, as for illustration, a wheel may be enabled selectively to be clutched in one-way direction to a shaft; clutched in either direction; or maintained in declutched position. It also contemplates the combination of a shaft and a plurality of wheels having hubs independently clutchable thereto by rolls operating on wedge faces with a selector for controlling the positions of the rolls. In a more specific form the selector includes a pair of shutter disks for each wheel, the members of each pair being shiftable about the shaft relative to one another and rotatable therewith to provide adjustable roll openings controlling the shifting of said rolls over said wedge faces to either enable one-way engaging clutching movement or to maintain said rolls in neutral declutching position. Another feature of the invention resides in means for selectively controlling the shifting of the disks. To this end, there is provided a cam shaft extending through said disks and engaged with follower openings therein whereby upon turning of said cam shaft in one direction the members of said pairs of disks are adjusted to control movement of said rolls over said faces, said follower openings and cam shaft being correlated so as to enable clutching and declutching of said wheels progressively. Another feature of this invention is the provision of an automatically operated means for actuating the disk controlling means, and for this purpose a speed governed control is provided. A further feature of this invention includes the provision of a manually controlled means to shift the disks, which means may be a cam shaft and both disk controlling means may be operable on said disks without interference. A still further feature of this invention includes details of structure.

As shown herein the invention is embodied in a transmission set for an automobile wherein free wheeling may be utilized; the gears progressively clutched; automatic operation of the set of gears may be employed; manual control of the gears may be employed; and either manual and automatic control may be used.

In the embodiment of the invention shown herein, free wheeling can be obtained at all speeds; automatic progressive gear changes may be effected by acceleration or deceleration of the engine. In addition, the operator has the option of manually selecting any of the forward positive fixed gear ratios, and when so selected, free wheeling action is not present and the engine may be used as a brake. This control may all be accomplished by movement of a dial hand lever conveniently located, as on the steering wheel.

These objects together with other objects and corresponding accomplishments are obtained by means of the embodiment of my invention illustrated in the accompanying drawings, in which:—

Figure 6:
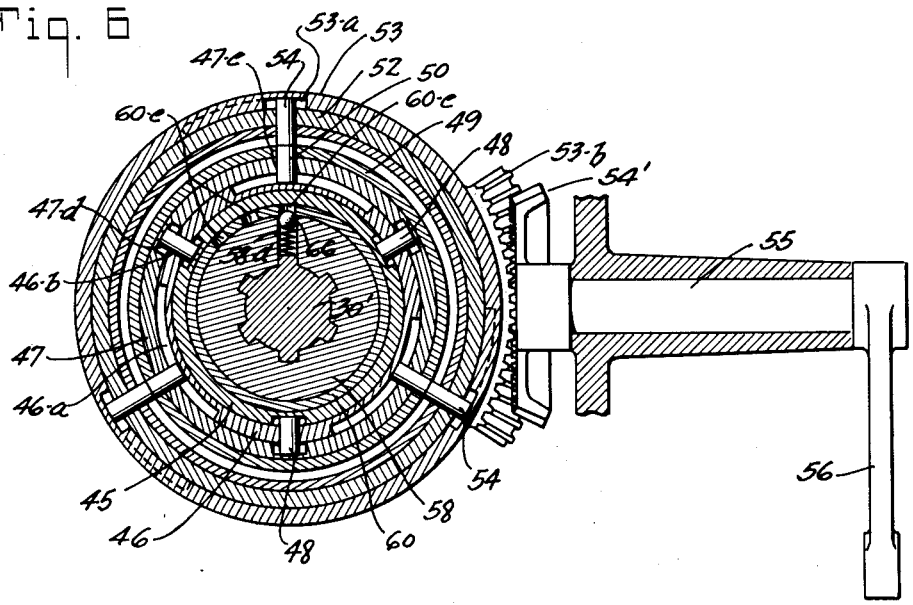
Figure 8:
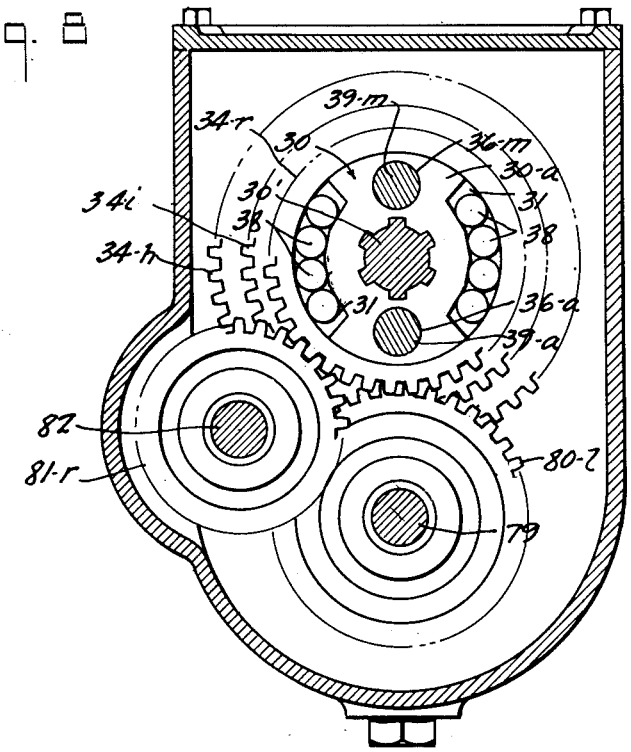
Figure 9:
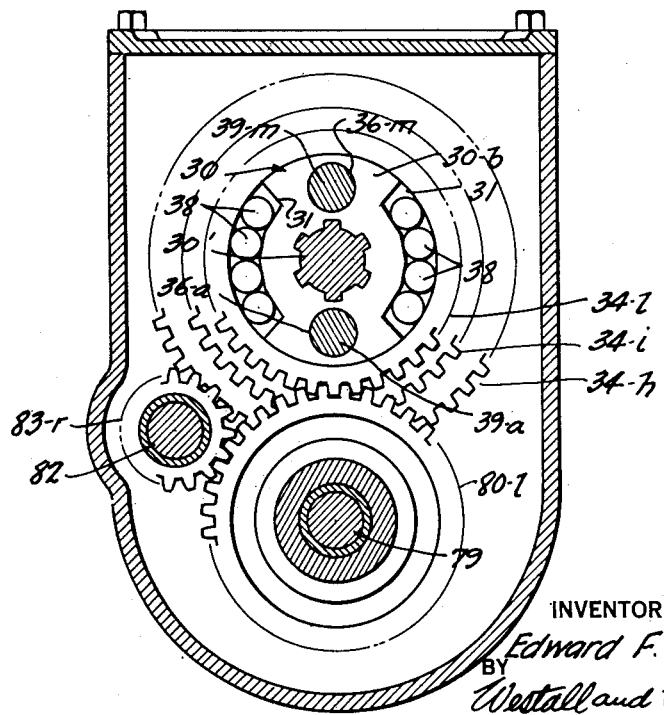
Figure 26:
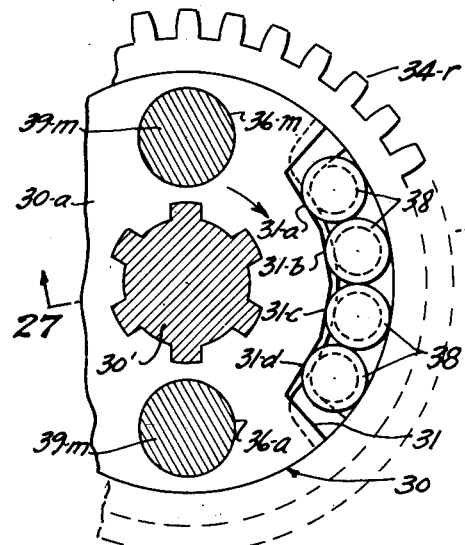
Figure 27:
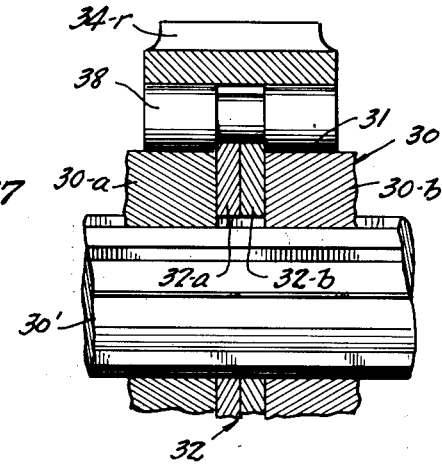
Figure 28:
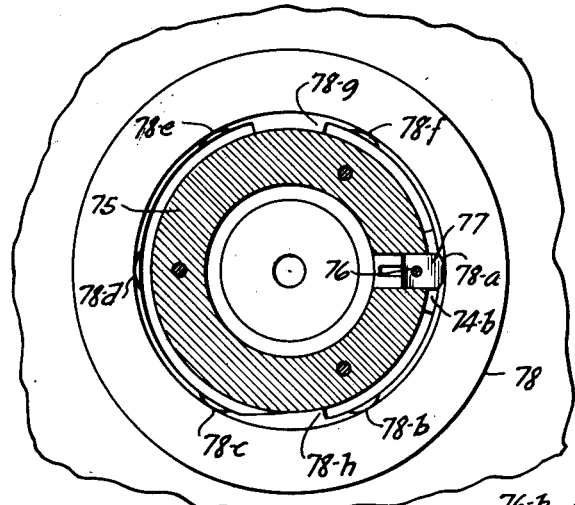
Figure 29:
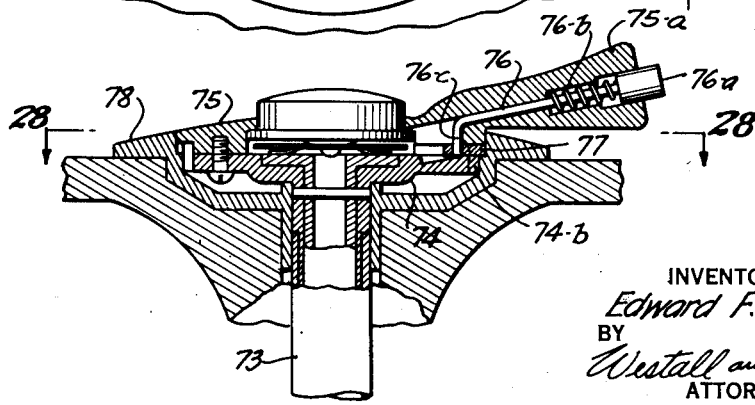
Figure 30:
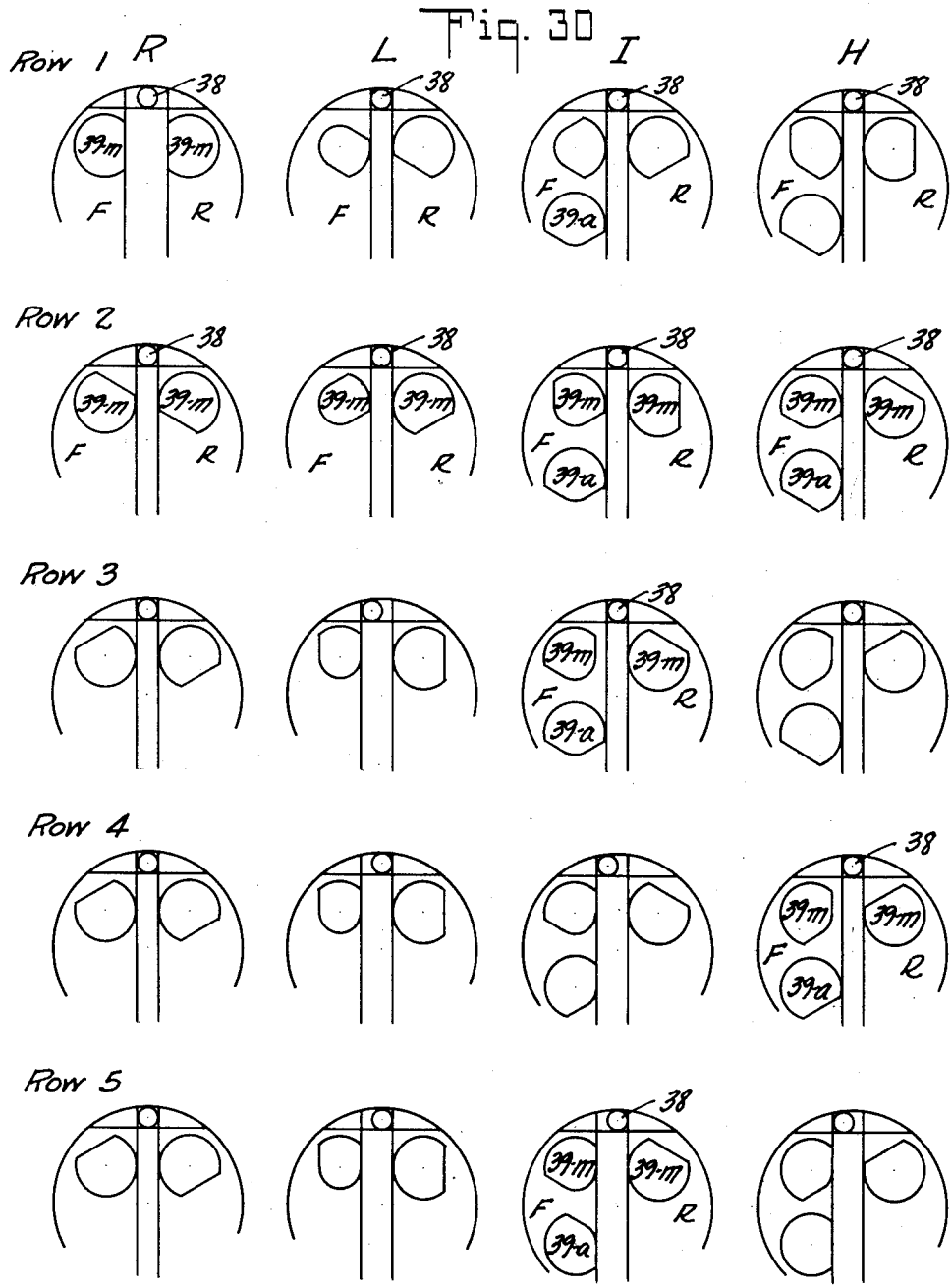

Fig. 1 is an elevation of a gear set unit including the dial controls and showing fragmentarily associated parts of an automobile; Fig. 2 is a plan view of the structure shown in Fig. 1; Fig. 3 is a longitudinal section through the gear set; Figs. 4–17 are sectional views as seen on the planes correspondingly indicated in Fig. 3; Fig. 18 is a disassembly perspective view of manual control elements namely, the stator screw sleeve, stator roll position ring, outside rotor ring and inside rotor ring, all shown in assembled relation in Fig. 6; Fig. 19 is a disassembly elevation of the manual rotor gear sleeve and its inside pinion gear forming a part of the manual control; Fig. 20 is an end elevation of the assembled parts shown in Fig. 19; Fig. 21 is a disassembly view in section as seen on the plane designated 21—21 in Fig. 19; Fig. 22 is a side elevation partly in section of the fixed rotor sleeve; Fig. 23 is an end view of the sleeve shown in Fig. 22; Fig. 24 is an end elevation partly in section of the stator sleeve; Fig. 25 is a side elevation partly in section of the stator sleeve; Fig. 26 is an enlarged fragmental view in section as seen in Fig. 8 showing the relation of gear wheel, clutch and selector cage; Fig. 27 is a section as seen on the plane designated 27—27 in Fig. 26; Fig. 28 is a sectional view through the driver's control dial assembly as seen on the plane designated 28—28 of Fig. 29; Fig. 29 is a sectional view through the driver's control; Fig. 30 is a diagrammatic view of the selector disks and cam shafts showing their correlations for control, horizontal Row 1 showing reverse positions; Row 2 showing idling positions; Rows 3, 4, and 5 showing respectively automatic low, intermediate and high positions; and Fig. 31 is a diagrammatic view similar to Fig. 30 for manual control showing in Rows 6, 7, and 8 respectively high, intermediate, and low positions.

Referring particularly to Figs. 1 and 2, an automobile engine is indicated by A. The clutch housing is denoted by B and may house a clutch of any well known conventional type, although an automatic clutch of special construction may be employed, if desired. However, the clutch forms no part of the present invention and the details thereof are not shown or described. Secured to the clutch housing is a gear set housing or transmission case C in which are the essential elements forming the present invention. The propeller or driven shaft is marked D. The usual steering post E has a hand wheel upon which the drivers control dial assembly F is mounted. G indicates a linkage connecting the dial asssembly and gear selector mechanism.

The fundamental feature of the invention resides in the clutches for the gears and the selector control therefor. The driving shaft of the engine is indirectly coupled to the drive shaft core 30 of the gear set through the clutch shaft as best shown in Fig. 3. The drive shaft may be in one piece but for convenience of assembly a core 30' comprising a spline shaft has sleeve sections 30a, 30b, 30c and 30d mounted thereon. The entire shaft assembly will hereafter be referred to by the reference numeral 30. A shoulder is provided on the end of core 30' to allow for retaining the sleeve sections thereon. To strengthen the assembly, overlapping longitudinal tongues 20f and 20g are provided on the ends of the sleeve sections as shown in Fig. 10. The drive shaft 30 has roller recesses 31 in its periphery. See Figs. 8, 9, 26 and 27. In the construction shown, there are a plurality of rollers in each recess. In Figs. 26 and 27 a recess on an enlarged scale is shown. Four rollers are shown in each recess. The base of each recess is irregular having chordal sections 31a, 31b, 31c and 31d, there being a chordal base for each roller. Each chordal base constitutes a double wedge face. Between sleeve sections are pairs of shutter disks indicated generally in Fig. 3 by 32. In Figs. 10 to 17 inclusive, the members of the pairs are marked 32a, 32b, 32c, 32d, 32e, 32f, 32g and 32h. Members 32a and 32b constitute one pair of disks and form a cage, for rollers, there being recesses 33a, 33b, 33c, 33d, 33e, 33f, 33g and 33h in the shutters corresponding to the roller recesses 31. The members of a pair of shutter disks are shiftable in relation to one another about shaft 30 so as to provide adjustable roller openings for controlling the positions of the rollers in recesses 31 and thereby their positions or movement on the chordal bases. Mounted over the shaft 30 to be rotatable thereon are gears 34r, 34l, 34i and 34h, respectively reverse, low, intermediate and high gears. Gear 34h is formed on the propeller driven shaft section 35, it having a socket fitting over the end of drive shaft 30. Cam shaft bearing openings are provided in the shaft 30 sleeve sections. These bearing openings are marked 36a and 36m and are respectively for an automatic cam shaft and for a manually controlled cam shaft. In the shutter disks are a series of alined cam shaft follower openings 37aa, 37ab, 37ac, 37ad, 37ae, 37af, 37ag, and 37ah and 37ma, 37mb, 37mc, 37md, 37me, 37mf, 37mg and 37mh respectively for the automatic and manually controlled cam shafts. In each of the recesses 31 are rollers 38, there being four shown in each recess. The rollers are shown of spool form with the shutter disks of a cage registered with the reduced portions of the rollers and holding them against lateral displacement. The rollers coact with the bearing faces of the hubs of the gears to provide reversible one-way engaging clutches. When the rollers are at the ends of their chordal bases, they wedge between the shaft 30 and gears to provide friction clutches. At the center of their chordal bases they are in declutched or neutral position and act as roller bearings for the gears. By proper adjustment of the shutter disks the rollers may be left free to effect one-way engaging clutching in either direction or they may be restrained to movement from one end of a base to the center effecting one-way engagement in one direction or they may be restrained against movement from neutral position leaving the gears to idle on shaft 30. The cam shafts 39m and 39a control the shutter disks and thereby the nature of the clutching action of the rollers. The propeller shaft section 35 is mounted in a ball bearing 40. Speedometer gearing is indicated generally by 41. The drive shaft is carried in a ball bearing 42.

Cam tracks are formed on cam shafts 39m and 39a to coact with the follower openings in the disks. These cam tracks and follower openings are so arranged and correlated that by turning the cam shafts in one direction the disks are progressively controlled in pairs to effect progressive one-way engaging clutching of the gears low, intermediate, and high. The preceding higher gears are maintained in neutral position and the succeeding gears are either maintained in neutral position or in one-way engaging position enabling overrunning of the succeeding gears. During the progressive forward gear changes, the reverse gear is maintained in neutral. The manually controlled cam shaft effects progressive reversible one-way clutching enabling the use of the engine as a brake. The automatic cam shaft controls the disks to allow progressive one-way engaging and free wheeling is obtained at any time when so dictated by the selector. Other positions of the manual cam shaft also enable reversible one-way engaging of the reverse gear with the forward gears in neutral, and all the gears in neutral or idling position. The cam shafts and followers are designed so that either cam shaft may be operated without interfering with the operation of the other. It will be noted that the cams are single edge cams wherein the followers must be returned by some force extraneous to the cams themselves. The cams limit the positions of the selector disks. They do not positively hold the rollers 38 or move the latter.

The diagrammatic views in Figs. 30 and 31 show the relations of the cam shafts and shutter disks. Each view illustrates a pair of shutter disks and a single roller, it being understood that one roller in a recess having a single chordal base functions the same as a multiplicity of rollers each having its own chordal base. Furthermore, each view shows two shutter disks of a pair, one of which may be termed a front disk and marked F and the other the rear disk marked R. These are shown side by side and in the same relative positions in each of the views. Reading from left to right, the views are in the order of the reverse, low, intermediate and high gear clutches and cages. Each row illustrates all of the clutches for one angular position of a controlling cam shaft. It will be noted from an inspection of Figs. 10-17 that certain of the follower openings in certain of the shutter disks have flat shoulders. The cooperating cam shaft tracks are of various shapes so that the shoulders may rest against the cam tracks and as the shafts are revolved the disks may rotate backward or forward into and out of neutral position. In other words, the cam tracks determine the relative positions of the shutter disks with respect to the rollers and their chordal faces. It is apparent that, if any pair of cam tracks is disposed to prevent its pair of disks from leaving their neutral positions, the rollers controlled thereby will not be able to travel into wedging or clutching position. However, either disk may be controlled so as to allow its companion rollers to travel into the clutching position. Thus, either neutral, one-way engaging in either direction desired or reversible one-way engaging positions may be attained. The upper cam shaft is the manually controlled cam shaft 39m and the lower cam shaft the automatic 39a. It will be noted that the shutter disks for reverse and low gears and the rear shutter disks R for intermediate and high gears are not shown with follower openings for the automatic cam shaft 39a, the openings for the automatic cam shaft being large enough so that rotation of the automatic cam shaft does not affect these shutter disks, the openings being elongated to allow movement of the disks. The manually controlled cam shaft alone affects the position of the reverse and low gear shutter disks and the rear disks R of the intermediate and high gears.

Following the action of the manual control shaft on the gears, consider Rows 1 and 2 of Fig. 30 and 8, 7 and 6 of Fig. 31 in the order before named. Row 1 shows the reverse position of the manual control cam shaft and Row 2 the initial or idling position. However, progression of the cam shaft may be considered as beginning in idling position or Row 2. In Row 2, the cam shaft 39m is positioned with the arcuate portions of the cam tracks of the reverse gear against the shoulders of the cam follower openings limiting movement of the disks from neutral position and the reverse gear idles. The cam tracks for the remaining forward gears are maintained with their arcuate portions against the shoulders of their respective follower openings, the disks being positioned with the rollers in neutral. The drive shaft 30 is free of all gears and the engine may idle. Turning the cam shaft 39m to the right sixty degrees, places the cam tracks in the position shown in Row 1. The shaft 39m has the reverse disks with follower opening shoulders bearing against shoulders on the cam tracks allowing the disks to be moved to their outer positions with the roller 38 free to wedge at either end of the base and thereby attain reversible one-way engaging clutching. The low gear disks shown in view L, Row 1 have their follower opening shoulders bearing against the concentric arcuate faces of their cam tracks so as to limit their disks to neutral position with roller 38 in neutral position so that the low gear is free to revolve. The automatic cam shaft 39a only affects disks F of the intermediate and high gears and in any position of the automatic cam shaft, the arcuate portions of its cam tracks also hold the front disks F of the intermediate and high gears in left hand neutral positions. In the positions shown in Row 1, the forward gears are neutral and the reverse gear is in reversible one-way engaging position. Turning the cam shaft 39m another one-sixth turn to the right from the position shown in Row 2, the cam tracks and disks are in the position shown in Row 8 of Fig. 31, which maintains the reverse gear disks in neutral. However, the low gear disks in column L are enabled to move to their outer positions by reason of the shoulders on their cam tracks allowing the shoulders of their respective follower openings to rest against them. It will be noted that the cam track for the front disk F of the low gear has two shoulders and the cam track for the rear disk R has one. The roller 38 if urged in either direction may effect one-way engaging clutching, moving the front and rear disks outwardly that is, low gear is in reversible one-way engaging clutching position. However, the disks for intermediate and high gears have their cam tracks with arcuate portions resting against their follower openings to maintain the disks in neutral position. Thus, all of the gears except low gear are in neutral and driving may be effected by low gear. Turning the cam shaft, 39m to the right another sixth turn from the position shown in Row 8 to that shown in Row 7, the reverse gear disks are still maintained in neutral, the front disk F for low gear has its cam track positioned with an arcuate portion of small radius positioned to permit the disk F to remain in its outer position. However, the cam track for the rear disk R has its arcuate portion engaged with the shoulder of its follower opening so that disk R of the low gear is moved to neutral, allowing forward overrunning of the low gear. The intermediate gear disks in second position as shown in Row 7 are enabled to move to outer positions by reason of the shoulders of their follower openings resting against shoulders on their cam tracks of shaft 39m. The high gear has its disks still maintained in neutral position by the follower openings and cam shaft tracks as shown. In second forward gear position, the reverse gear is in neutral, low gear in forward overrunning position, intermediate gear reversible one-way engaged and high gear neutral. In the third forward position as shown in Row 6, the reverse gear is maintained neutral, low gear in forward overrunning position; and intermediate gear has its front disk resting against a smaller radius arcuate face of its cam track to enable maintaining of outer position of the front disk F and the rear disk R is moved to neutral position thereby allowing forward overrunning of the intermediate gear. The high gear disks rest against shoulders on their cam tracks allowing outer positions and reversible one-way engagement. In the third forward position, the reverse gear is neutral, low and intermediate gears forward overrunning and high gear reversible one-way engaging with respect to the drive shaft. In each of the manual selective positions shown in Rows 6, 7 and 8, the engine may be used as a brake. It will be noted that the automatic cam shaft 39a which may control the intermediate and high gear disks is disposed in each of the three positions so as to coact with the manual cam shaft 39m and have no deterrent effect upon the control by the manually controlled cam shaft.

Referring to Rows 3, 4 and 5 in Fig. 30, the automatic action of gear change is shown. The reverse and low gear disks are unaffected by the automatic cam shaft. The manually controlled cam shaft 39m is placed in position with arcuate portions of its cam tracks engaging the shoulders of the follower openings of the rear disks R of the intermediate and high gears holding these disks in their neutral positions. The cam tracks on the shaft 39m for the front disks F of the intermediate and high gears have their shoulders positioned with respect to their companion follower openings to enable these disks to be moved to outer positions. This position of cam shaft 39m is different from that heretofore described and is attained by a movement to automatic position by the dial lever control later described. The automatic cam shaft 39a in first position as shown in Row 3 has its arcuate portion of its cam track engaging the shoulder of its follower opening holding disk F of intermediate gear in neutral position. The cam shaft 39m holds disk R of the intermediate gear in neutral position so that the intermediate gear is free. Cam track of shaft 39a has its arcuate portion engaging front disk F of the high gear and shaft 39m holds companion rear disk R in neutral so that high gear is neutral. In this first forward position all gears are in neutral except low gear which is in one-way forward engaging position so that low gear drives. In the second position, Row 4, cam shaft 39a is positioned allowing intermediate gear front disk F to rest against a shoulder on its cam track and attain one-way forward engaging position. High gear disks F and R are maintained in neutral. This allows the intermediate gear to drive, low gear to be overrun, and the other gears are in neutral. In third forward position shown in Row 5, the reverse, low and intermediate gear disks are not disturbed, but the high gear front disk F is allowed by its cam track to move to outer position, while the companion rear disk R is maintained in neutral. This places the high gear in one-way forward engaging position, the intermediate and low gears in one-way forward overrunning position and the reverse gear in neutral. The high gear then takes possession of the driving.

If the high gear is in possession by manual selection as shown in Row 6 and the speed drops below that at which the intermediate gear would automatically take possession of driving, that is, idling speed, then the automatic cam shaft 39a is positioned as shown in Row 3. The front disk F of the high gear is disposed in left hand neutral position by automatic cam shaft 39a and the high gear may utilize the engine as a brake. The front disk F of the intermediate gear is moved by cam shaft 39a to left hand neutral position and the intermediate gear is neutral. At idling speed, neither the high gear nor intermediate gear can drive. However, the low gear may take possession and drive. As the speed increases to automatic possession by the intermediate gear, the cam shaft 39a positions itself as shown in Row 4 to allow the front disk F of the intermediate gear to be moved to outer position, and the intermediate gear takes possession of driving. As the speed is further increased to high speed gear possession the front disk F is allowed by cam shaft 39a to be moved to outer position, the low and intermediate gears overrun and the high speed gear again takes possession. Thus, automatic starting power with positive gear control and braking by high gear is obtained. If the disks are in positive selective position for intermediate gear driving as shown in Row 7, the engine may be utilized as a brake by way of the intermediate gear. If in this position of the cam shaft 39m, the speed drops to idling speed, automatic cam shaft 39a is in the position shown in Row 3. High gear is still in neutral. Front disk F of the intermediate gear is moved to left hand neutral position with the intermediate gear then in neutral. The low gear cam then drive and as speed is increased to automatic intermediate gear position, the automatic cam shaft 39a allows intermediate gear disk F to attain the position shown in Row 4 and the intermediate gear again takes possession. It is seen by comparison that automatic cam shaft 39a controls disks F in Rows 8, 7, and 6 as it did in Rows 3, 4, and 5. However, in Rows 8, 7, and 6, the disks R allow braking by the engine to be utilized, while in Rows 3, 4, and 5, they allow free wheeling.

It will be noted from a comparison of Rows 3, 4, and 5 with Rows 8, 7 and 6, that the automatic cam shaft, which during operation of the set is in service, has no position interfering with manual control of the gears by the shaft 39m. It follows the manual control shaft.

The means for operating the manually controlled cam shaft 39m will now be described. See Figs. 3, 6, 7, and 18 to 25. At the end of the shaft 39m is a pinion 43. A rotor ring gear 44 has a segmental tooth portion which meshes with pinion 43. The ring gear 44 fits within the open flange 45a of a rotor sleeve 45 and is locked thereto by tongues 44a which fit into corresponding mortises in the flange 45a. Sleeve 45 has three spiral shaped grooves 45b on its outer surface. Mounted over rotor sleeve 45 is a rotor rotor ring 46 having three segmental circumferential grooves 46a and three holes 46b. The rotor ring 46 is disposed within a fixed rotor sleeve 47 which has a flange 47a with half round recesses 47b as shown in Fig. 5, engaging bosses on a governor core sleeve which is fixed to shaft 30. The fixed rotor sleeve 47 is secured to the governor core sleeve by flat headed bolts 47c threaded into corresponding tapped holes. In the wall of the bore of sleeve 47 are three spiral grooves 47d and on the periphery are three axial slots 47e. Three rollers 48 are fitted into grooves 45b and 47d passing through holes 46b in rotor ring 46. On the outside of fixed rotor sleeve 47 is an outside rotor ring 49 having three inwardly extending pins 50 passing through axial slots 47e. Pins 50 extend into circumferential grooves 46a on rotor ring 46. The entire assembly is such as to rotate with drive shaft 30. Rotor ring 49 has a circumferential groove 49a extending around the ring. A stator roller position ring 51 is disposed about rotor ring 49 and acts as a cage for stator rollers having openings 51a in which the rollers are disposed. A fixed stationary stator sleeve 52 has a flange 52a. The body of the sleeve surrounds the assembly before described. The flange 52a is bolted to the transmission case. Three axial slots 52b extend through the stator sleeve. Surrounding stator sleeve 52 is a stator screw sleeve 53 which has three spiral grooves 53a on its inside wall. Fitting into grooves 53a are stator rollers 54 which pass through axial slots 52b in fixed stator sleeve 52, through holes 51a in cage ring 51 and into rotor ring groove 49a. On the outside of stator screw sleeve 53 is a segmental gear 53b. See Fig. 6. Segmental gear 53b meshes with a pinion 54' which is secured to a shaft 55. Shaft 55 is journalled in the crank case housing and has a crank lever 56 secured to its outer end. The crank lever 56 is swung by means of the linkage indicated generally by G in Fig. 1.

In the operation of the manual control system crank arm 56 may be swung by the operator through linkage G later described in detail. This causes stator sleeve 53 to be turned which in turn acts upon rollers 54. The rollers are restrained by stator sleeve 52 to axial movement and are held circumferentially spaced by stator roller position ring 51. The rollers 54 act upon outside rotor ring 49 and carry the latter axially. Ring 49 due to groove 49a can revolve with the drive shaft 30 while being moved axially. The outside rotor ring 49 by its pins 50 engaging in slots 47e of fixed sleeve 47 rotates with drive shaft 30 but may be moved axially thereof. The pins 50 extend into grooves 46a of inside rotor ring 46 and thereby the latter ring is caused to be moved axially with outside ring 49. Inside rotor ring 46 has holes 46b through which rollers 48 extend and engage with spiral grooves 47d in fixed rotor sleeve 47. Therefore, as the axial motion takes place, the inside rotor ring 46 is twisted through an angle. Rollers 48 also engage the spiral grooves 45b in rotor gear sleeve 45 and a rotating motion is applied to the latter. The result is a double twisting motion applied to rotor gear sleeve 45. This turns ring gear 44 which in turn rotates pinion 43 and thereby cam shaft 39m. The angular position of crank arm 56 thus determines the angular position of cam shaft 39m and the position of the shutter disks.

Referring to the automatic cam shaft 39a and its control mechanism, a pinion 57 is secured to shaft 39a. Mounted on and splined to drive shaft core 30' is a governor core sleeve 58 having longitudinal tongues 58a which engage in corresponding recesses in adjacent drive sleeve section 30a. Surrounding the drive shaft core 30' and within tongues 58a between the body of the governor core sleeve 58 and the drive shaft sleeve section 30a is an automatic gear sleeve 59 having teeth on a segment of its periphery engaging pinion 57. A radial tongue 59a protrudes between tongues 58a. An automatic control sleeve 60 surrounds core sleeve 58 and the tongue 59a fits into a recess 60a therein. See Figs. 3 and 7a. A flange 60b is provided on control sleeve 60 with channels 60c. Governor core sleeve 58 has a flange 58b in which are slots 58c. Governor weights 61 embrace governor core sleeve 58 and are pivotally secured to flange 58b by pins 62. Governor weight control springs 63 of torsion type fit over pins 62 engaging the weights 61 and are adjustable by washers 62a and locked by nuts 62b. The amount that the weights 61 are urged toward the center of the governor control sleeve 58 may thus be adjusted. The weights 61 carry pins 64 extending through channels 58c and 60c. The governor core sleeve 58 is splined to shaft core 30' and the clutch shaft 65 connection is also splined to the governor core sleeve. In core sleeve 58 is a socket 58d housing a detent ball 66 pressed outwardly by a spring. Three recesses 60e in the body of control sleeve 60 are disposed for registration with detent ball 66.

The motor causes the core assembly including the governor weight arms 61 to rotate. The spring tension on the arms 61 is adjusted so that at idling speed of the engine there is no material movement of arms 61 outward. However, as the motor speed increases, the governor arms 61 swing outward. The pins 64 move with the weights and by their engagement with control sleeve 60 through channels 60c turn the control sleeve in relation to the drive shaft 30. This motion is transmitted to gear sleeve 59 and by way thereof to pinion 57 and automatic cam shaft 39a. Turning of the cam shaft 39a is commensurate with the speed. There are three angular positions of the cam shaft 30a which are important and detent ball 66 coacting with recesses 60e tend to hold the control sleeve in these positions.

The driver's control is accomplished through acceleration and deceleration of the engine in combination with the setting of a dial handle. The handle operates over a dial and the handle and dial may be conveniently situated on the steering column at the steering wheel. Lever arm 56 is connected by a rod 67 to one arm of a double crank 68. The other arm of crank 68 is secured by a rod 69 to a lever 70 having fixed thereto a sector worm gear 71. The worm gear meshes with a worm 72 mounted on a dial shaft 73. The dial shaft may be disposed within the steering post, and as the details thereof are not pertinent to the present invention they are not described. Dial shaft 73 is secured to a dial lever shaft plate 74 and operating lever plate 75 is screwed thereto. A lever handle 75a for turning the dial shaft 73 extends from the operating lever plate 75. The handle 75a has a bore with a counterbore at the outer end. Slidably mounted in the bore is a detent lever rod 76 having a button 76a at its outer end and urged outwardly by a spring 76b. The rod 76 has a laterally turned end 76c for engagement in a hole in radially slidable stop lug 77. Dial plate 74 has a stop lug 74b operating in a circumferential clearance space. Surrounding the dial lever assembly is a dial plate 78 of ring form which is fixed to a stationary column. The dial plate contains sector markings on its face and a clearance space is provided between it and dial lever plate 74 for accommodation of a radially extending stop lug 74b. At each sector center point on dial plate 78 on the inner edge are detent recesses 78a—78f which receive the stop lug 77. At 78g is shown a fixed stop which extends downwardly far enough to be engaged by a stop lug 74b. A stop 78h is disposed in the path of revolution of stop lug 77, but may be passed by retraction of lug 77.

As the handle 75a is revolved clockwise stop lug 77 first engages stop 78h. By retraction of lug 77 accomplished by pushing button 76a, the stop may be cleared and revolution of handle 76a continued clockwise until lug 74b engages stop 78g. There are six positions of the handle 75a. With stop lug 77 in detent recess 78a the manual cam shaft 39m is in the position shown in Row 2 of Fig. 30, or idling position. Moving the handle counter clockwise and engaging stop lug 77 in detent recess 78f places the gear set in reverse as shown in Row 1. Positioning the handle with stop lug in detent recess 78b places the manual cam shaft 39m in the position shown in Rows 3 to 5 and the automatic cam shaft 39a takes control. To pass from automatic to manual control, button 76a is depressed so that stop lug 77 may clear stop 78h and the handle may be turned farther clockwise with stop lug 77 progressively engaging detent recesses 78c, 78d and 78e placing the cam shaft 39m successively in the positions shown in Rows 6, 7, and 8 of Fig. 31. Stop 78g prevents continuance of rotation into reverse position and vice versa.

Referring again to the gears within the transmission case, a counter shaft 79 has journalled thereon pinion gears 80l, 80i and 80h fixed to a common hub. Gears 80l, 80i and 80h are meshed with forward gears 34l, 34i and 34h respectively. Gear 34r meshes with idler gear 81r fixed to idler shaft 82. A gear 83r is fixed to idler shaft 82 and meshed with gear 80l thereby reversing the direction of rotation of the counter shaft as compared with driving through gears 34l and 80l. It will be noted that all the gears are continuously in mesh but that only one gear 34r, 34l, 34i or 34h takes control in driving. The driving of propeller shaft section 35 from gears 34r, 34l or 34i takes place through the counter shaft by way of gear 80h and 34h. Direct drive is accomplished by clutching gear 34h to shaft 30, gear 34h being a part of shaft section 35.

In the operation by the driver, the engine may be started by placing the dial lever handle 75a in the position shown in Fig. 28. The gear set is then in neutral and the engine may idle. To back up, the lever handle is swung to the counter clockwise until detent stop lug 77 seats in its detent socket 78f which will be noted both by a click and the change in resistance to the movement. To start in automatic the handle is swung to position detent stop in recess 78b. Change of speed then occurs automatically. For manual change the handle is swung clockwise and button 76a depressed to clear stop 78h, and positions 78c, 78d and 78e selected for speeds high, intermediate and low respectively. The handle can not be continued from low position into reverse by reason of stop 78g. In automatic position change of speed is effected by acceleration and deceleration of the engine. A conventional clutch may be used and operated in the conventional manner.

What I claim is:—

1. The combination with a shaft and a rotatable member clutchable thereto, of a reversible one-way engaging clutch therebetween having elements engageable by rotation of said shaft in either direction in relation to said member and having a neutral disengaging position; and single edge cam means for selectively limiting said elements either to neutral position, positions enabling one-way engagement either way, or positions enabling one-way engagement both ways.

2. The combination with a shaft and a rotatable member having a hub clutchable thereto, of a reversible one-way engaging clutch therebetween: said clutch comprising said hub, double wedge faces on said shaft and rolls therebetween; and a selector including cage members having roll openings and shiftable about said shaft relative to one another to provide adjustable roll openings enabling either the shifting of said rolls over said wedge faces to clutching and declutching positions both ways, to limit the shifting of said rolls to either one-way engaging positions, or to declutching position.

3. The combination with a shaft and a wheel having a hub clutchable thereto, of a one-way engaging clutch therebetween; said clutch comprising said hub, wedge faces on said shaft, rolls therebetween: and a selector including shutter disks shiftable about said shaft relative to one another and rotatable therewith to provide adjustable roll openings allowing the shifting of said rolls over said wedge faces to either enable clutching and declutching movement or to maintain said rolls in declutching position; an automatic disk control means to coact with said disks whereby said roll openings may allow movement of said rolls over said faces to enable one-way engaging clutching or to maintain declutching position of said rolls; speed governed means operated with said shaft to actuate said automatic disk control means; and a non-interfering manually actuable disk control means to coact with said disks to selectively enable one-way clutching or to maintain declutching.

4. The combination with a shaft and a wheel having a hub clutchable thereto, of a one-way engaging clutch therebetween; said clutch comprising said hub, wedge faces on said shaft and rolls therebetween: and a selector including cage mechanism with restraining means for said rolls, said mechanism being shiftable about said shaft and rotatable therewith to adjust the restraining means and allow the shifting of said rolls to effect one-way engaging clutching in either direction or to maintain declutching; said mechanism having single edge cam follower openings, a cam shaft extending through said openings and controlling the shifting movement of said members whereby to select either or both one-way engaging position or declutching position of said cage mechanism.

5. The combination with a shaft and a wheel having a hub clutchable thereto, of a one-way engaging clutch therebetween; said clutch comprising said hub, wedge faces on said shaft and rolls therebetween: and a selector including shutter disks shiftable about said shaft relative to one another and rotatable therewith to provide adjustable roll openings therebetween allowing either the shifting of said rolls over said wedge faces to effect one-way clutching or to maintain said rolls in declutching position; follower openings in said disks, and a single edge cam shaft extending through said follower openings whereby upon turning of said cam shaft said disks may coact therewith to control movement of said rolls over said faces to either one-way engaging clutching positions or to maintain declutching positions.

6. The combination with a shaft and a wheel having a hub clutchable thereto, of a one-way engaging clutch therebetween; said clutch comprising said hub, wedge faces on said shaft and rolls therebetween: and a selector including shutter disks shiftable about said shaft relative to one another and rotatable therewith to provide adjustable roll openings allowing the shifting of said rolls over said wedge faces to effect one-way clutching or to maintain said rolls in declutching position; said disks having follower openings, an automatic single edge cam shaft extending through said follower openings whereby upon turning of said cam shaft said disks may coact therewith to control movement of said rolls over said faces either to enable one-way engaging clutching positions or to maintain declutching position; and speed governed means operated with said shaft to turn said automatic cam shaft.

7. The combination with a shaft and a wheel having a hub clutchable thereto, of a one-way engaging clutch therebetween; said clutch comprising said hub, wedge faces on said shaft and rolls therebetween: and a selector including shutter disks shiftable about said shaft relative to one another and rotatable therewith to provide adjustable roll openings allowing the shifting of said rolls over said wedge faces to either effect one-way clutching or to maintain said rolls in declutching position; said disks having follower openings, an automatic cam shaft extending through said follower openings whereby upon turning of said cam shaft disks may coact therewith to control movement of said rolls over said faces either to enable one-way engaging clutching positions or to maintain declutching positions; speed governed means operated with said shaft to turn said automatic cam shaft; other follower openings in said disks, and a non-interfering manually controlled cam shaft extending through said openings whereby upon turning of said manually controlled cam shaft said disks may coact therewith to control movement of said rolls over said faces to one-way engaging clutching positions or to maintain declutching positions.

8. The combination with a shaft and a plurality of wheels having hubs independently clutchable thereto, of one-way engaging clutches between said hubs and shaft; each of said clutches comprising a hub, wedge faces on said shaft and rolls therebetween; a selector including cage members for the hubs with restraining means for said rolls, said members being shiftable about said shaft and rotatable therewith to adjust the restraining means and allow the shifting of said rolls over said wedge faces to either enable one-way engaging clutching movement or to maintain said rolls in neutral declutching positions; single edge cam control means whereby to co-act with said members and thereby limit movement of said rolls over said faces, said cam control means progressively acting with said edge members enabling one-way engaging clutching of said wheels and with preceding wheels in declutching position.

9. The combination with a shaft and a plurality of wheels having hubs independently clutchable thereto, of one-way engaging clutches between said hubs and shaft; each of said clutches comprising a hub, wedge faces on said shaft and rolls therebetween: a selector including cage members for the hubs with restraining means for said rolls, said members being shiftable about said shaft and rotatable therewith to adjust the restraining means and allow the shifting of said rolls over said wedge faces to either enable one-way engaging clutching movement or to limit said rolls to neutral declutching positions; automatic single edge cam control means for engagement with all of said members whereby to co-act with the latter and thereby limit movement of said rolls over said faces, said cam control means progressively acting with said members enabling one-way engaging clutching of said wheels and with the preceding wheels in declutching position; and governor means operated with said shaft to operate said automatic cam control means.

10. The combination with a shaft and a plurality of wheels having hubs independently clutchable thereto, of one-way engaging clutches between said hubs and shaft; each of said clutches comprising a hub, double wedge faces on said shaft and rolls therebetween: a selector including cage members for the hubs with restraining means for said rolls, said members being shiftable about said shaft and rotatable therewith to adjust the restraining means and allow the shifting of said rolls over said wedge faces either to enable one-way clutching engagement both ways, one-way engaging clutching movement either way, or to maintain said rolls in neutral declutching positions; automatic single edge cam means for said cage members to coact with all of the latter and adjustably control the movement of said rolls, said automatic cam means and cage members being correlated so as to progressively act with the cage members enabling one-way engaging clutching of said wheels; governor means operated with said shaft to operate said automatic cam means; and a manually operable control means for coacting with all of said cage members to progressively enable one-way clutching engagement both ways.

11. The combination with a shaft and a plurality of wheels having hubs independently clutchable thereto, of one-way engaging clutches between said hubs and shaft; each of said clutches comprising a hub, wedge faces on said shaft and rolls therebetween: a selector including a pair of shutter disks for each hub, the members of each pair being shiftable about said shaft relative to one another and rotatable therewith to provide adjustable roll openings limiting the shifting of said rolls over said wedge faces to either enable one-way engaging clutching movement or to limit said rolls to neutral declutching positions; said disks having follower openings, and a single edge cam shaft extending through said disks and engaged with said follower openings whereby upon turning of said cam shaft in one direction the members of said pairs of disks co-act therewith to limit movement of said rolls over said faces, said follower openings and cam shaft being correlated so as to progressively act with said pairs of disks enabling one-way engagement clutching of said wheels.

12. The combination with a drive shaft and a plurality of wheels having hubs independently clutchable thereto, of one-way engaging clutches between said hubs and shaft; each of said clutches comprising a hub, wedge faces on said drive shaft and rolls therebetween: a selector including a pair of shutter disks for each hub, the members of each pair being shiftable about said shaft relative to one another and rotatable therewith to provide adjustable roll openings limiting the shifting of said rolls over said wedge faces to either enable one-way engaging clutching movement or to limit said rolls to neutral declutching position; said disks having follower openings, an automatic single edge cam shaft extending through said disks and engaged with said follower openings whereby upon turning of said automatic cam shaft in one direction a member of each pair of disks is coacted with to limit movement of said rolls over said faces to one-way engaging clutching positions or to limit said rolls to neutral position, said follower openings and automatic cam shaft being correlated so as to progressively act with the pairs of disks enabling one-way engaging clutching of said wheels; and governor means operated with said drive shaft to turn said automatic cam shaft.

13. The combination with a shaft and a plurality of wheels having hubs independently clutchable thereto, of one-way engaging clutches between said hubs and shaft; each of said clutches comprising a hub, wedge faces on said shaft and rolls therebetween: a selector including a pair of shutter disks for each hub, the members of each pair being shiftable about said shaft relative to one another and rotatable therewith to provide adjustable roll openings limiting the shifting of said rolls over said wedge faces to either enable one-way engaging clutching movement of said rolls, or to limit said rolls to neutral declutching position; said disks having follower openings, an automatic single edge cam shaft extending through said disks and engaged with said follower openings whereby upon turning of said cam shaft in one direction the members of said pairs of disks coact therewith to limit movement of said rolls over said faces, said follower openings and automatic cam shaft being correlated so as to progressively act with the disks enabling one-way engaging clutching of said wheels; governor means operated with said shaft to turn said automatic cam shaft; other follower openings in said disks, and a non-interfering manually operable single edge cam shaft extending through said disks and engaged with said other follower openings to limit movement of said rolls over said faces so as to progressively position said disks in one-way engaging positions.

14. The combination with a shaft and a plurality of wheels having hubs independently clutchable thereto, of reversible one-way engaging clutches between said hubs and shaft; each of said clutches comprising a hub, double wedge faces on said shaft and rolls therebetween: a selector including a pair of shutter disks for each hub, the members of each pair being shiftable about said shaft relative to one another and rotatable therewith to provide adjustable roll openings limiting the shifting of said rolls over said wedge faces to either enable one-way clutching movement, reversible one-way clutching movement or to limit said rolls to neutral declutching position; said disks having follower openings, a manually operable single edge cam shaft extending through said disks for engagement with said follower openings whereby upon turning of said cam shaft in one direction the members of said pairs of disks coact therewith to limit movement of said rolls over said faces to reversible one-way engaging clutching positions or to maintain neutral position, said follower openings and manually operable cam shaft being correlated so as to progressively act with said disks enabling reversible one-way engaging clutching of said wheels; other follower openings in said disks, an automatic single edge cam shaft extending through said disks and engaged with said other follower openings whereby upon turning of said automatic cam shaft in one direction the members of said pairs of disks coact therewith to limit movement of said rolls over said faces, said follower openings and automatic cam shaft being correlated so as to progressively act with said disks enabling one-way engaging clutching of said wheels; and governor means operating with said shaft to turn said automatic cam shaft.

15. In a speed change gear set, the combination with a drive shaft and a plurality of gear wheels having hubs independently clutchable thereto, of reversible one-way engaging clutches between said hubs and shaft, said gear wheels comprising a reverse gear and a plurality of progressive forward gears; each of said clutches comprising a hub, double wedge faces on said drive shaft and rolls therebetween: a selector including a pair of shutter disks for each hub, the members of each pair being shiftable about said drive shaft relative to one another and rotatable therewith to provide adjustable roll openings limiting the shifting of said rolls over said wedge faces to either enable clutching and declutching movement or to limit said rolls to neutral declutching position; follower openings in said disks, an automatic single edge cam shaft extending through said disks for engagement with said follower openings whereby upon turning of said cam shaft in one direction the members of said pairs of disks coact therewith to limit movement of said rolls over said faces to one-way engaging clutching positions or to neutral position, said follower openings and automatic cam shaft being correlated so as to progressively act with said disks to enable one-way engaging clutching of said forward gears progressively with the remaining gears in neutral; governor means operated with said drive shaft to turn said automatic cam shaft; other follower openings in said disks, and a manually controlled single edge cam shaft for engagement with said other follower openings, said manually controlled cam shaft and other follower openings being correlated so as to progressively act with said disks enabling reversible one-way engaging clutching of said reverse gear with the remaining gears in neutral, next to place all of said gears in neutral, and thereafter to progressively enable reversible one-way engaging clutching of said forward gears and with said reverse gear in neutral.

16. In a speed change gear set, the combination with a drive shaft, a driven shaft and a plurality of gear wheels having hubs independently clutchable thereto, of one-way engaging clutches between said hubs and shaft; said gear wheels comprising a plurality of progressive gears and a high gear fixed to said driven shaft; a counter shaft, a corresponding number of gears fixed to said counter shaft and meshed with said gear wheels: each of said clutches comprising a hub, wedge faces on said shaft and rolls therebetween: a selector including a pair of shutter disks for each hub, the members of each pair being shiftable about said shaft relative to one another and rotatable therewith to provide adjustable roll openings limiting the shifting of said rolls over said wedge faces to either enable one-way engaging clutching movement or to maintain said rolls in neutral declutching position; follower openings in said disks, and a single edge cam shaft extending through said disks for engagement with said follower openings whereby upon turning of said cam shaft in one direction the members of said pairs of disks coact therewith to limit movement of said rolls over said faces to one-way clutching position or to neutral position, said follower openings and cam shaft being correlated so as to act with said disks to progressively enable one-way engaging clutching of said gears.

17. In a speed change gear set, the combination with a drive shaft, a driven shaft and a plurality of gear wheels having hubs independently clutchable thereto, of reversible one-way engaging clutches between said hubs and shaft; said gear wheels comprising a reverse gear, a plurality of progressive forward gears and a high gear fixed to said driven shaft; a counter shaft, a corresponding number of gears fixed to said counter shaft and meshed with said gear wheels; each of said clutches comprising a hub, double wedge faces on said shaft and rolls therebetween: a selector including a pair of shutter disks for each hub, the members of each pair being shiftable about said shaft relative to one another and rotatable therewith to provide adjustable roll openings limiting the shifting of said rolls over said wedge faces to either enable reversible one-way engaging clutching movement or to limit said rolls to neutral declutching position; follower openings in said disks, and a manually controlled single edge cam shaft extending through said disks for engagement with said follower openings whereby upon turning of said cam shaft in one direction the members of said pairs of disks coact therewith to limit movement of said rolls over said faces either to enable reversible one-way engaging clutching position or to neutral position, said follower openings and cam shaft being correlated so as to progressively act with said disks to place said reverse gear wheel in reversible one-way engaging clutching position and the remaining gear wheels in neutral position, next to act with said disks to place all of said gear wheels in neutral position and thereafter to act with said disks to place said reverse gear wheel in neutral position and enabling reversible one-way clutching of the remaining gear wheels.

18. In a change speed gear set, the combination with a drive shaft, a driven shaft and a plurality of gear wheels having hubs independently clutchable thereto, of reversible one-way engaging clutches between said hubs and shaft; said gear wheels comprising a reverse gear, a plurality of progressive forward gears and a high gear fixed to said driven shaft; a counter shaft, a corresponding number of gears fixed to said counter shaft and meshed with said gear wheels; each of said clutches comprising a hub, double wedge faces on said shaft and rolls therebetween: a selector including a pair of shutter disks for each hub, the members of each pair being shiftable about said shaft relative to one another and rotatable therewith to provide adjustable roll openings limiting the shifting of said rolls over said wedge faces to either enable reversible one-way engaging clutching movement or to limit said rolls to neutral declutching position; follower openings in said disks, a manually controlled single edge cam shaft extending through said disks for engagement with said follower openings whereby upon turning of said cam shaft in one direction the members of said pairs of disks coact therewith to limit movement of said rolls over said faces to enable reversible one-way engaging clutching position or to limit neutral position, said follower openings and cam shaft being correlated so as to progressively act with said disks to place said reverse gear wheel in reversible one-way engaging clutching position and the remaining gear wheels in neutral position, next to act with said disks to place all of said gear wheels in neutral position and thereafter to place said disks with said reverse gear wheel in neutral position and enabling reversible one-way clutching of the remaining gear wheels; other follower openings in said disks, and an automatic single edge cam shaft extending through said other follower openings whereby to coact with said disks, said other follower openings and cam shaft being correlated so as to act with said disks to place said reverse gear in neutral and said forward gears progressively in one-way engaging positions.

19. The combination with a shaft and a rotatable member having a hub clutchable thereto, of a reversible one-way engaging clutch therebetween; said clutch comprising said hub, double wedge faces on said shaft and rolls therebetween; and a selector including cage means having roll openings shiftable about said shaft to selectively limit shifting of said rolls over said wedge faces to clutching and declutching positions both ways, to limit the shifting of said rolls to either one-way engaging positions, or to declutching position.

20. The combination with a shaft and a rotatable member clutchable thereto, of a reversible one-way engaging clutch therebetween having elements engageable by rotation of said shaft in either direction in relation to said member to provide one-way clutching and having a neutral disengaging or declutching position; single edge cam means for selectively limiting said elements either to neutral position, positions enabling one-way engagement either way, or positions enabling one-way engagement both ways; control means to operate said cam means to selectively enable one-way clutching or to maintain declutching.

21. The combination with a shaft and a rotatable member clutchable thereto, of a reversible one-way engaging clutch therebetween having elements engageable by rotation of said shaft in either direction in relation to said member to provide one-way clutching and having a neutral disengaging or declutching position; single edge cam means for selectively limiting said elements either to neutral position, positions enabling one-way engagement either way, or positions enabling one-way engagement both ways; governor means operated with said shaft to automatically actuate said cam means to enable one-way clutching or to maintain declutching; and a manually operable control means non-interfering with said governor means to operate said cam means to selectively enable one-way clutching or to maintain declutching.

EDWARD F. WANTLAND.